(No Model.)
A. BRUNNER.
EYEGLASS FOLDING FRAME.
No. 531,095. Patented Dec. 18, 1894.
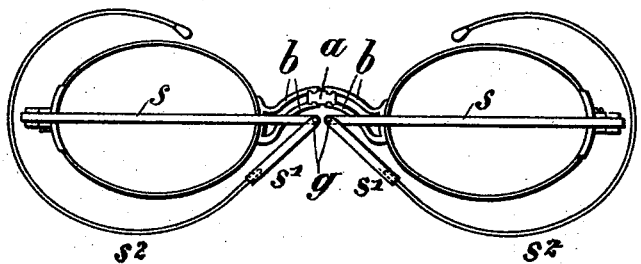
Fig. 1.
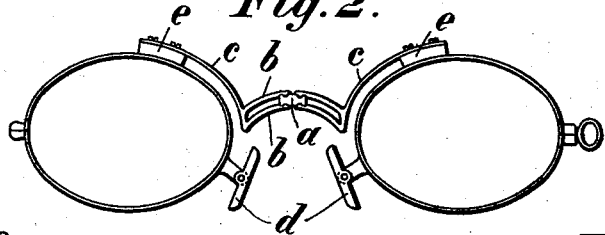
Fig. 2.
Fig. 6.
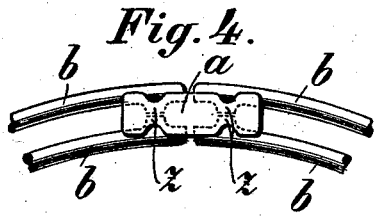
Fig. 3.
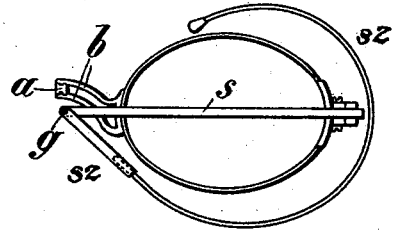
Fig. 7.
Fig. 4. Fig. 5.
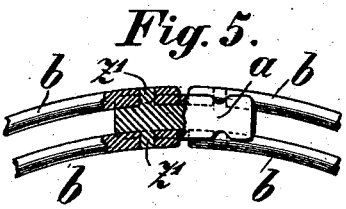
Witnesses:
B. S. Ober
Harry Ott
Inventor:
Alfred Brunner
by Harry Ott, att'y

UNITED STATES PATENT OFFICE.

ALFRED BRUNNER, OF LAUPEN, SWITZERLAND.

EYEGLASS FOLDING FRAME.

SPECIFICATION forming part of Letters Patent No. 531,095, dated December 18, 1894.

Application filed October 2, 1894. Serial No. 524,745. (No model.)

*To all whom it may concern:*

Be it known that I, ALFRED BRUNNER, a citizen of the Republic of Switzerland, and a resident of Laupen, in the Republic of Switzerland, have invented certain new and useful Eyeglass Folding Frames, of which the following is a specification.

My invention has relation to spectacles, and it has for its object a construction whereby they are adapted to be folded into a very small compass and conveniently carried in the pocket or in a small sheath.

It is a well established fact that spectacles are more beneficial to the eyes than eyeglasses, yet preference is given to the latter for the reason that they can be folded into a small compass and more conveniently carried when not in use, a construction heretofore not applied to spectacles. For this reason oculists will recommend eye-glasses particularly for intermittent use by short-sighted children in preference to spectacles.

The invention consists essentially in the provision of means whereby spectacles are adapted to be folded or doubled up in approximately as small a compass as eye glasses, the said invention being applicable to the latter also, in the construction of which a spring bridge has heretofore been employed of sufficient elasticity to adapt the glasses to be laid one upon the other, a suitable locking device, as a stud and hook being provided to hold the glasses in their superposed relation.

According to my invention I provide a bridge composed of two sections and a joint piece to which said sections are articulated so as to fold, said joint piece being of such a construction as to lock the bridge sections against motion either when extended for use or when folded, as will now be fully described, reference being had to the accompanying drawings, in which—

Figure 1 is an elevation of a pair of spectacles embodying my invention, the bows being folded. Fig. 2 illustrates the invention in its application to eye-glasses. Fig. 3 shows the spectacles completely folded, and Figs. 4 to 7 are detail views of the hinge joint of the two-part bridge, Fig. 5 illustrating a slight structural modification.

Similar letters of reference indicate like parts wherever such may occur in the drawings described above.

The bows B of the spectacles are preferably constructed in three sections, $s, s', s^2$. The rigid sections $s$ are hinged at one end to the rims in any usual or preferred manner, a second rigid section $s'$ being hinged or pivoted at $g$ to said sections $s$, while the third section $s^2$ is a spring bow rigidly connected to section $s'$, the pivotal connection of the two parts of the bow being about midway of the bow, or between the rim and ear. The bridge is constructed of three parts or sections, namely: two pairs of springs $b\ b$ of suitable curvature secured at one end to the rim of the glasses, and of a hinge knuckle or joint piece $a$. The springs $b\ b$ are provided at their free ends with a stud Z, which studs converge and take into holes $l\ l$, Fig. 6, of the aforesaid joint piece or hinge knuckle $a$, said joint piece being grooved longitudinally on its upper and under side and transversely across the pivot holes $l$, Figs. 4 and 6. It will readily be seen that when the studs Z, Z, on the springs $b\ b$ of the two sections of the bridge are sprung into the holes $l\ l$ of the joint piece, said springs will lie in the longitudinal grooves $l'$ of said knuckles $a$, the bridge being rigidly held in position by said grooves. When, however, the bridge sections are turned at right angles to the joint piece $a$, the springs $b\ b$ of said sections will spread and ride over the faces of the joint, and when at right angles thereto will snap into the transverse grooves $l^2$ and lock the two halves of the spectacles into a folded position. Inasmuch as the bows are also jointed, and the outer sections $s^2$ thereof are bow springs, the curve or ear end of said outer sections will lie about the rims of the spectacles, the latter being folded into a very small compass, as shown in Fig. 3, not materially exceeding the dimensions of the glasses when the spectacles are sheathed, in view of the compressibility of the bow sections $s^2$.

In Fig. 2 I have shown the invention in its application to eye glasses, and from what has been said above, the construction will be readily understood. It will be seen that the joint piece $a$ is so constructed as not to project either below or above the springs $b\ b$ of the bridge, leaving the bearing face of the latter perfectly smooth, and if desired the well-known cork cushions may be applied to the lower springs without interfering with the hinge joint of the bridge.

Instead of forming the studs Z on the bridge springs *b* said studs may be formed on the hinge knuckle or joint piece *a*, as shown at Z' Fig. 5, without departing from the spirit of my invention.

Having thus described my invention, what I claim as new therein, and desire to secure by Letters Patent, is—

1. The combination with a pair of eye-glass frames connected by a foldable bridge, of temple bows each composed of a rigid and a spring section articulated together, said spring section bent into a loop and adapted to encompass the eye-glass frames when folded, for the purpose set forth.

2. The combination with a pair of eye-glass frames and a bridge composed of two sections, of a joint piece provided with pivot bearings for a lug at the proximate ends of the sections and locking grooves or recesses intersecting the pivot bearings at right angles in which grooves the ends of the bridge sections are adapted to seat, for the purposes set forth.

3. Spectacles provided with a two part bridge, each part composed of two springs, in combination with a joint piece grooved longitudinally in its upper and lower faces and provided with pivot bearings for the free ends of said springs and with grooves intersecting said pivot bearings, the ends of said springs adapted to seat in said longitudinal and transverse grooves when in a normal position or when turned at right angles to the joint piece respectively, for the purpose set forth.

In testimony whereof I hereunto sign my name, in the presence of two subscribing witnesses, this 25th day of August, 1894.

ALFRED BRUNNER.

Witnesses:
  MORITZ VEITH,
  H. RAEHART.